June 14, 1938.   B. B. RANEY   2,120,908
CASSETTE FILTER
Filed Feb. 5, 1936   2 Sheets-Sheet 1
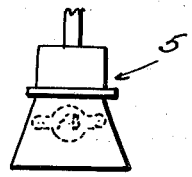
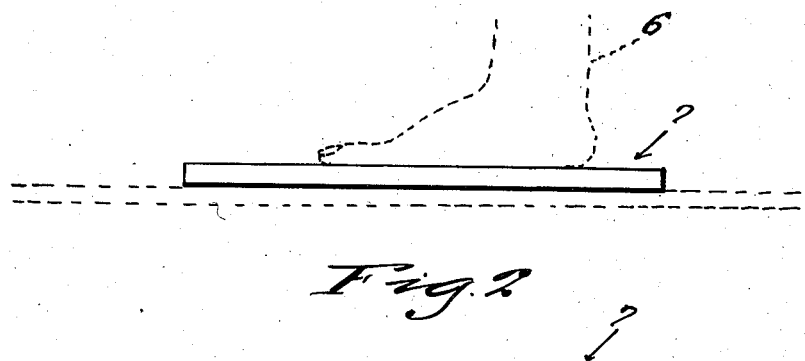
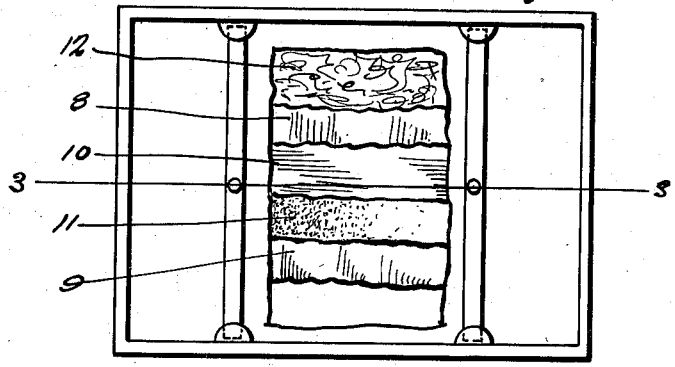
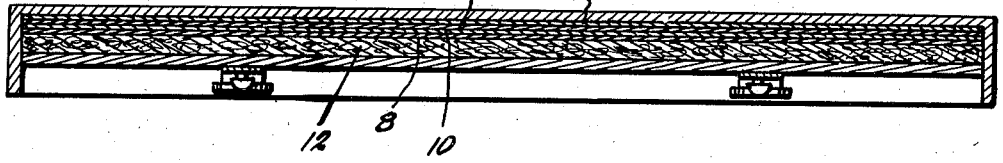
Inventor
B. B. Raney
By Clarence A. O'Brien and
Hyman Berman
Attorney June 14, 1938.  B. B. RANEY  2,120,908
CASSETTE FILTER
Filed Feb. 5, 1936  2 Sheets-Sheet 2
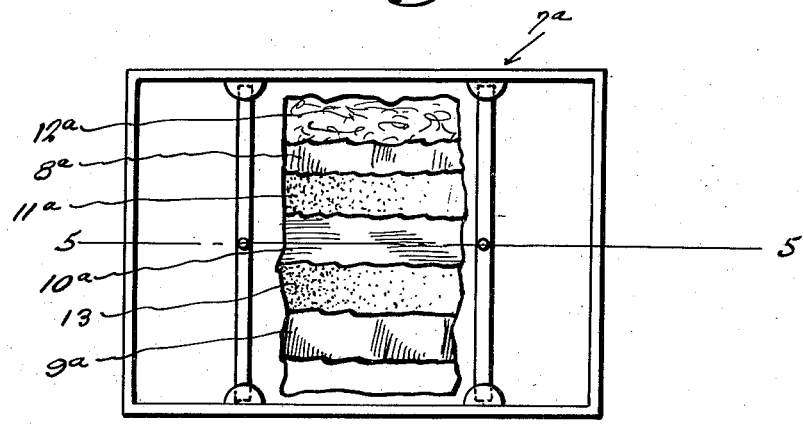
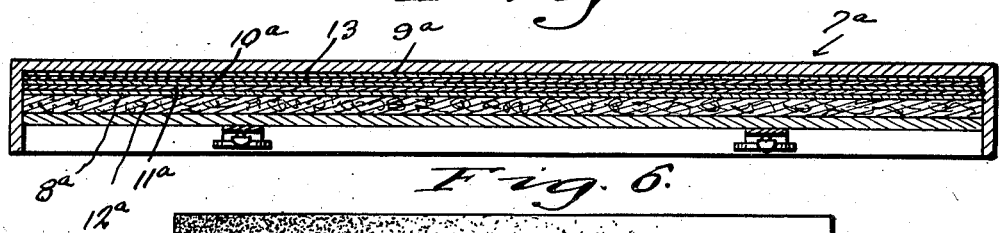
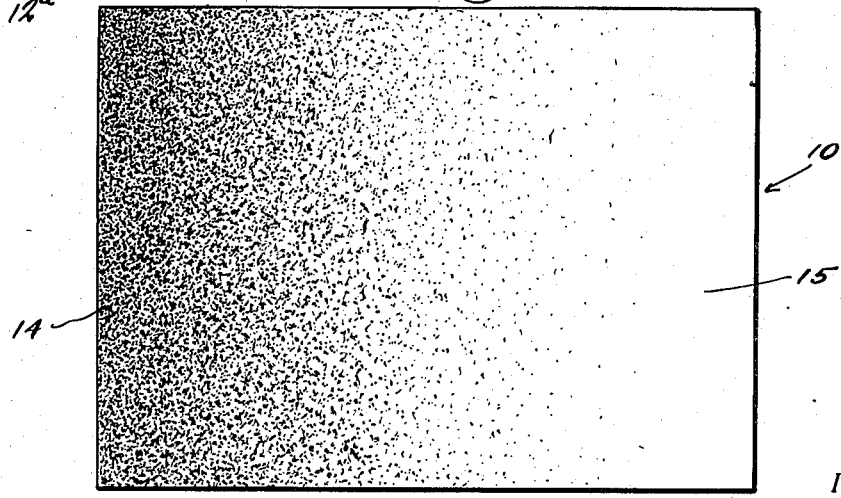
Inventor
B. B. Raney
By Clarence A. O'Brien and
Hyman Berman
Attorneys Patented June 14, 1938

2,120,908

UNITED STATES PATENT OFFICE 2,120,908

CASSETTE FILTER

Ben B. Raney, Linton, Ind.

Application February 5, 1936, Serial No. 62,532

7 Claims. (Cl. 250—34)

My invention relates generally to apparatus utilized in X-ray photography or radiography, and particularly to a cassette filter involving means for obstructing the passage of fluorescent rays from the X-ray screens so as to vary the effectiveness of the X-ray radiation over different areas of the film non-uniformly, and an important object of the invention is to provide simple, efficient, and easily handled arrangement of this character.

Other important objects of my invention will be apparent from a reading of the following description in connection with the drawings, wherein for purposes of illustration I have shown preferred embodiments of my invention.

In the drawings:—

Figure 1 is a general diagrammatic representation of an application of the invention in radiographing a human foot.

Figure 2 is a top plan view of a cassette filter in accordance with the present invention involving one filter.

Figure 3 is a longitudinal sectional view taken through Figure 2 approximately on the line 3—3.

Figure 4 is another embodiment of the invention involving a filter on opposite sides of the film.

Figure 5 is a longitudinal sectional view taken through Figure 4 approximately on the line 5—5.

Figure 6 is a plan view of a filter in accordance with the present invention.

In taking an X-ray picture with a cassette and fluorescent screens of conventional type, only about one-eighth of the exposure of the film is due to X-rays, the other seven-eighths being due to that pale blue light of fluorescence which is produced by the action of the X-rays on the fluorescent screens in the cassette on opposite sides of the film. I have discovered that by interposing a sheet of varying degrees of opacity and transparency to fluorescent light, the passage of the fluorescent light from the screens to the film may be reduced so that the firm is less affected by the fluorescent light where the shading on the sheet is most opaque; and that the action of the fluorescence from the screen is not affected where the sheet is fully transparent; so that a film may be corrected for varying densities or thicknesses of the parts to be X-rayed or radiographed.

The thin transparent sheets used may be of esters of cellulose or of similar material, painted or colored over selected areas to reduce the transmission of fluorescent light from the fluorescent screen to the photosensitive film. Such fluorescent rays being visible light and ultra-violet, such painted or colored areas of the sheet probably do not have the effect of retarding the X-rays themselves. Inasmuch as it is the fluorescent light emitted by the screens under the action of the X-rays, which is responsible for about seven-eighths of the effect on the film, the filter sheets retard the action of the fluorescent rays over selected parts of the film and thereby cause the corresponding parts of the film to be lighter than ordinarily would be the case. In this way and in accordance with the present invention the effect upon the film will be resolved into that produced by the one-eighth caused by the X-rays and the seven-eighths caused by the fluorescence minus those portions of the fluorescent rays which are obstructed by the painted or less transparent portions of the filters of the present invention. It is obvious that the transmission to the film of fluorescent rays may be diminished and regulated and controlled as necessary or as desired simply by varying the degree of shading of filters.

Referring in detail to the drawings, the numeral 5 generally designates an X-ray tube, the numeral 6 a human foot being radiographed, and the numeral 7 generally designates a cassette filter in accordance with the present invention.

The back of the cassette shown in Figure 2 is cut away to disclose the usual fluorescent screen 8, the companion fluorescent screen 9, the conventional film 10, and a single filter 11 in accordance with the present invention, and the felt packing 12. The felt layer is at the back of the cassette, the screen 8 next thereto, and the film 10, the filter of the present invention, and the second screen 9 follow in the order named forwardly toward the front of the cassette.

In the embodiment of the invention shown in Figure 4 which exhibits the back of the cassette cut away, the felt layer is designated 12a, the fluorescent screen 8a, one of the two filters in accordance with the present invention 11a, the film 10a, the second conventionally present fluorescent screen 9a and the second filter in accordance with the present invention is designated 13. In this arrangement of the invention a filter in accordance with the present invention is located on opposite sides of the film instead of only on one side as in the embodiment shown in Figures 2 and 3.

Reference to Figure 6 will indicate suggested modes of gradiently painting or otherwise rendering opaque selected portions of the filter 11 composed of esters of cellulose by painting or otherwise coloring the surfaces thereof. It will be obvious that the relatively opaque portions 14 achieved by painting or in some other suitable manner will retard the transmission of the fluorescent rays to a greater extent than the comparatively transparent unpainted portion 15.

Although I have shown and described herein preferred embodiments of my invention, it is to be definitely understood that I do not desire to limit the application of the invention thereto, and any change or changes may be made in the materials, and in the structure and arrangement of the parts, within the spirit of the invention and the scope of the subjoined claims.

What is claimed is:—

1. A method of predetermining the distribution and amount of exposure of an X-ray film to the action of fluorescent rays in a cassette containing fluorescent screens on opposite sides of the film, said method comprising interposing between one of the fluorescent screens and the film an X-ray transparent filter having certain areas thereof relatively transparent and other areas relatively opaque to fluorescent rays, then subjecting the cassette to the X-rays with the object to be radiographed interposed between the cassette and the source of X-rays.

2. A method of correcting the photographic effect of the presence of areas of different density in an object being radiographed on the film used, said method comprising radiographing the object by establishing a primary source of X-radiation at one side of said object and a cassette at the opposite side of said object for containing and supporting the said film, said cassette containing means adapted to generate fluorescence under the action of the X-rays reaching the cassette, and partially blocking the transmission of the fluorescence to areas of said film corresponding in position to said areas of different density of the said object while permitting the passage of the X-rays to said film.

3. A method of correcting the photographic effect produced on a film by the transmission of fluorescent light to the film during the operation of radiographing an object having areas of different density in accordance with the amount of and distribution of density in such areas, said method comprising partially blocking the transmission of the fluorescent light to areas of the film corresponding to less dense areas of the object being radiographed while permitting the normal transmission of the X-rays to the film.

4. A method of correcting the photographic effect produced on a film by the transmission of fluorescent light to the film during the operation of radiographing an object having areas of different density in accordance with the amount of and distribution of density in such areas, said method comprising partially blocking the transmission of the fluorescent light to areas of the film corresponding to less dense areas of the object being radiographed while permitting the normal transmission of the X-rays to the film, and without changing the color of the fluorescent light in its transmission to the film.

5. A filter adapted to be interposed between an X-ray sensitive film and a fluorescent screen for limiting and distributing the effect of the fluorescent rays on the film, said filter comprising a sheet permeable by X-rays and by fluorescent rays, and a distribution on said sheet of material relatively opaque to fluorescent rays, the last-mentioned material being arranged as to location and density in accordance with the relative location and density of the said areas of the object being radiographed.

6. A filter adapted to be interposed between an X-ray sensitive film and a fluorescent screen for limiting and distributing the effect of the fluorescent rays on the film, said filter comprising a sheet permeable by X-rays and by fluorescent rays, and a distribution on said sheet of material relatively opaque to fluorescent rays, the last-mentioned material being arranged as to location and density in accordance with the relative location and density of the said areas of the object being radiographed, the said sheet being composed of esters of cellulose, and said last-mentioned material comprising paint.

7. A filter of the character described composed of thin material equally transparent to X-rays in all parts and provided with areas varying in resistance to fluorescent rays, said filter being adapted when used in a conventional cassette with a film to permit the free passage of X-ray radiation to the film while obstructing the fluorescent rays emanating from the screen of the cassette in varying amounts over various areas, before the fluorescent rays reach the film.

BEN B. RANEY.